(12) United States Patent
Volodin et al.

(10) Patent No.: US 7,391,703 B2
(45) Date of Patent: Jun. 24, 2008

(54) METHODS FOR MANUFACTURING VOLUME BRAGG GRATING ELEMENTS

(75) Inventors: Boris Leonidovich Volodin, West Windsor, NJ (US); Sergei Dolgy, Lambertville, NJ (US); Vladimir Sinisa Ban, Princeton, NJ (US)

(73) Assignee: PD-LD, Inc., Pennington, NJ (US)

( * ) Notice: Subject to any disclaimer, the term of this patent is extended or adjusted under 35 U.S.C. 154(b) by 731 days.

(21) Appl. No.: 10/947,990

(22) Filed: Sep. 23, 2004

(65) Prior Publication Data

US 2005/0099930 A1    May 12, 2005

Related U.S. Application Data (60) Provisional application No. 60/506,409, filed on Sep. 26, 2003.

(51) Int. Cl.
*G11B 7/00* (2006.01)
*G02B 6/34* (2006.01)

(52) U.S. Cl. ............... 369/103; 385/37; 385/38; 359/3; 369/109.01

(58) Field of Classification Search ........... 369/103, 369/109.01; 385/36, 37; 359/3
See application file for complete search history.

(56) References Cited

U.S. PATENT DOCUMENTS

| | | | |
|---|---|---|---|
| 4,057,408 A | 11/1977 | Pierson et al. ............. 65/18 |
| 4,095,875 A | 6/1978 | Lee et al. ................ 350/320 |
| 4,514,053 A | 4/1985 | Borrelli et al. ........... 350/162.2 |
| 4,942,102 A | 7/1990 | Keys et al. ................. 430/1 |
| 4,943,126 A * | 7/1990 | Lang et al. ................ 359/12 |
| 5,115,338 A | 5/1992 | DiGiovanni et al. ....... 359/337 |
| 5,491,570 A | 2/1996 | Rakuljic et al. ............. 359/7 |
| 5,655,040 A * | 8/1997 | Chesnoy et al. ............ 385/37 |
| 5,684,611 A | 11/1997 | Rakuljic et al. ............. 359/7 |
| 5,691,989 A | 11/1997 | Rakuljic et al. ............ 372/20 |
| 5,796,096 A | 8/1998 | Rakuljic et al. ........... 250/226 |
| 6,093,927 A * | 7/2000 | Wickham ............. 250/227.23 |
| 6,249,624 B1 * | 6/2001 | Putnam et al. ............. 385/37 |
| 6,269,203 B1 | 7/2001 | Davies et al. .............. 385/24 |
| 6,586,141 B1 | 7/2003 | Efimov et al. .............. 430/1 |
| 6,673,493 B2 | 1/2004 | Gan et al. ................ 429/233 |
| 7,184,616 B2 * | 2/2007 | Mead et al. ................ 385/10 |
| 2001/0028483 A1 | 10/2001 | Buse ....................... 359/15 |

(Continued)

FOREIGN PATENT DOCUMENTS

SU    178-429 A1    11/1990

OTHER PUBLICATIONS

Borgman, V.A., et al., "Photothermal refractive effect in silicate glasses," *Sov. Phys. Dokl.*, Nov. 1989, 1011-1013.

(Continued)

*Primary Examiner*—Thang V. Tran
(74) *Attorney, Agent, or Firm*—Woodcock Washburn LLP (57) ABSTRACT

Methods for recording volume Bragg grating structures having a target wavelength are disclosed. Such a method may include providing a photosensitive recording medium, bringing a first face of the recording medium into contact with a face of a prism, the prism being made of a material that is transparent at a recording wavelength, and recording a Bragg grating onto the recording medium by exposing the prism to an incident light wave at the recording wavelength.

33 Claims, 9 Drawing Sheets

U.S. PATENT DOCUMENTS

2002/0045104 A1 4/2002 Efimov et al. .................. 430/2
2002/0176126 A1 11/2002 Psaltis et al. .................. 359/15

OTHER PUBLICATIONS

Borrelli, N.F., et al., "Photosensitive glasses and glass-ceramics," *Glass Processing*, 439-444, Dec. 1998.

Breer, S., et al., "Low-crosstalk WDM by bragg diffraction from thermally fixed reflection holograms in lithium niobate," *Electronics Letts.*, 1998, 34(25), 2419-2421.

Churin, E.G., et al., "Design of free-space WDM router based on holographic concave grating," *IEEE Photonics Techn. Letts.*, Feb. 1999, 11(2), 221-223.

Dicing Solutions for DWDM optical filter applications; advertising brochure of *ADT Advanced Dicing Technologies*, Stockholm, Sweden, 2003, 2 pages.

Efimov, O.M., et al., "High-efficiency bragg gratings in photothermorefractive glass," *Applied Optics*, Feb. 1, 1999, 38(4), 619-627.

Glebov, L.B., et al., "Pholychromic glasses—a new material for recording volume phase holograms," *Sov. Phys. Dokl.*, Oct. 1990, 35(10), 878-880.

Glebov, L.B., "Photosensitive glass for phase hologram recording," *Glass Science and Technology*, 1998, 71C, 85-90.

Hendow, S.T., "Crystal bragg gratings stabilize laser sources," *Laser Focus World*, Nov. 1996, S19-S24.

Kogelnik, H., et al., "Coupled wave theory for thick hologram gratings," *The Bell System Technical Journal*, Nov. 1969, 48(9), 2909-2947.

Liu, J., et al., "Modeling and design of planar slanted volume holographic gratings for wavelength-division-multiplexing applications," *Applied Optics*, Dec. 1, 1999, 6981-6986.

Moslehi, B., et al., "Fiber-optic wavelength-division multiplexing and demultiplexing using volume holographic gratings," *Optics Letters*, Oct. 1, 1989, 1088-1090.

Qiao, J., et al., "Dispersion-enhanced volume hologram for dense wavelength-division demultiplexer," *IEEE Photonics Technology Letts.*, Aug. 2000, 12(8), 1070-1072.

Rakuljic, G.A., et al., "Volume holographic narrow-band optical filter," *Optical Engineering*, Oct. 1997, 36(10), 459-461.

Sayano, K., "Holographic grating filters in optical glasses for C31 WDM networks," *Accuwave Corp., sponsored by Ballistic Missile Defense Organization*, May 1998, AFRL-SN-RS-TR-1998-81, Final Technical Report, 1-35, DL-1-DL-3.

Timofeev, F.N., et al., "Free-space grating multi/demultiplexer and wavelength-router for densely spaced WDM networks," *IEE*, 1997, 11/1-11/5, 372-373.

Zhao, F., et al., "Reliable grating-based wavelength division (de)multiplexers for optical networks," *Opt. Eng.*, Jul. 2001, 40(7), 1204-1211.

Zhao, F., et al., "Subpicometer accuracy laser wavelength sensor using multiplexed bragg gratings," *IEEE Photonics Technology Letts.*, Nov. 1997, 9(11), 1493-1495.

Zhao, F., et al., "Ultraviolet Ca K-line narrow-bandwidth imaging filters based on holographic Bragg gratings in photorefractive materials," *Opt. Eng.*, Oct. 1997, 36(10), 2918-2921.

\* cited by examiner

METHODS FOR MANUFACTURING VOLUME BRAGG GRATING ELEMENTS

CROSS-REFERENCE TO RELATED APPLICATIONS

This application claims benefit under 35 U.S.C. § 119(e) of provisional U.S. patent application 60/506,409, filed on Sep. 26, 2003, the disclosure of which is incorporated herein by reference.

FIELD OF THE INVENTION

The invention is related generally to volume Bragg grating elements for fiber optic devices, spectroscopic devices, lasers and other light sources, military and space applications and any other optical devices. More particularly, the invention provides methods for manufacturing volume Bragg grating elements that are suitable for use in such optical devices.

BACKGROUND OF THE INVENTION

The manufacturing of reflective VBG filters for a wide variety of wavelengths critically depends on the ability to record these filters holographically using a fixed recording wavelength $\lambda_{rec}$ that is shorter than the operation wavelength $\lambda_{op}$ of the filter. Accordingly, a method of "side-writing" a VBG filter was developed for photorefractive lithium niobate. Such a method is described in U.S. Pat. No. 5,491,570, for example.

This method has a number of drawbacks, such as, for example, the limited usable wavelength range (i.e., $\lambda_{op} > n^* \lambda_{rec}$), complexity of sample preparation (e.g., the necessity to polish at least two orthogonal faces of the sample), and the inability to tune the operating wavelength in a wide range (i.e., greater than approximately 40 nm). Further, the method of "side-writing" has a fundamental limit on the clear aperture of the filter recorded in this way. This is due to the fact that the recording beams of light are necessarily absorbed in the material in order to create the required photo-induced changes of the refractive index and, as a result, the penetration depth of the recorded grating is limited by the material absorption. For this reason, the clear aperture of reflective VBG filters recorded in this way is typically no more than approximately 4-6 mm, depending on the properties of the material and the particular specification on the uniformity of the filter.

It would be desirable, therefore, if systems and methods were available for manufacturing VBG filters with increased clear aperture, increased center wavelength tuning range and improved efficiency of fabrication.

SUMMARY OF THE INVENTION

The invention described herein provides a method of injecting recording light into a recording medium through the same surface as either the input or output surface of the filter (hereafter called operating surfaces of the filter). Two beams of recording light, which typically have a wavelength substantially shorter than the operating wavelength of the filter, are made to intersect inside the medium at an angle $\theta_{rec}$, such that:

$$\sin\theta_{rec} = \frac{\lambda_{rec}}{\lambda_{op}} \frac{n_{op}}{n_{rec}} \sin\theta_{op}, \quad (1)$$

where $\lambda_{op}$ and $\theta_{op}$ are the operating wavelength and the diffraction angle of the filter inside the medium, respectively, $n_{op}$ and $n_{rec}$ are the refractive indices of the material at the operating and recording wavelengths, respectively.

As the recording wavelength is typically substantially shorter than the operating wavelength (e.g., $\lambda_{op}$=1064 nm, $\lambda_{rec}$=325 nm), it is typically impossible to inject the light at the recording wavelength into the medium at such angles directly through the operating surface of the filter due to the total internal reflection (i.e., $n_{rec}*\sin(\pi/2-\theta_{rec})>1$ for these conditions).

DETAILED DESCRIPTION OF ILLUSTRATIVE EMBODIMENTS

Figure 1A:
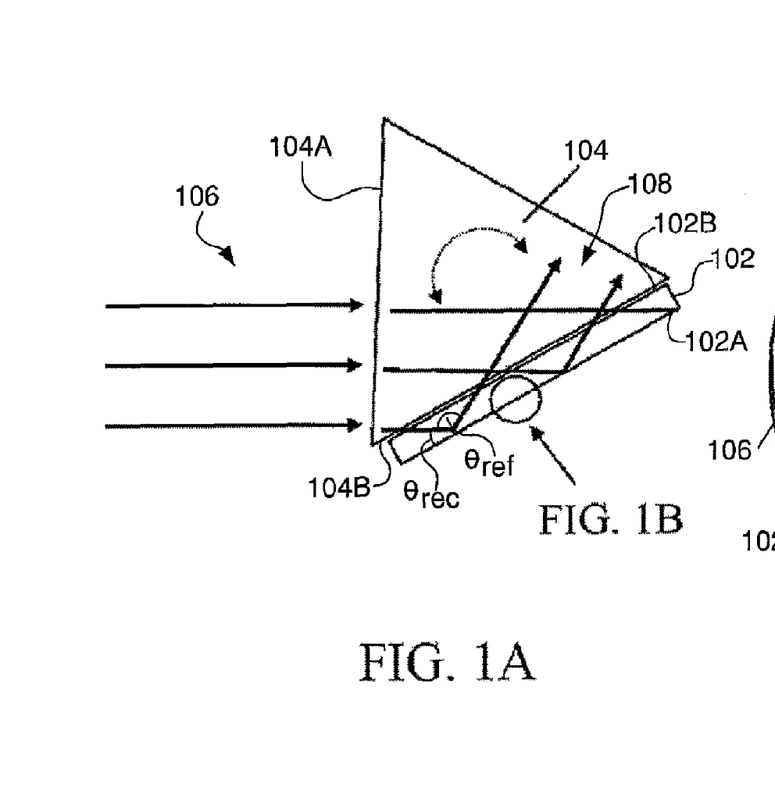
FIGS. 1A and 1B depict recording with a prism via total internal reflection (TIR) on the outside surface of the sample.
Figure 1B:
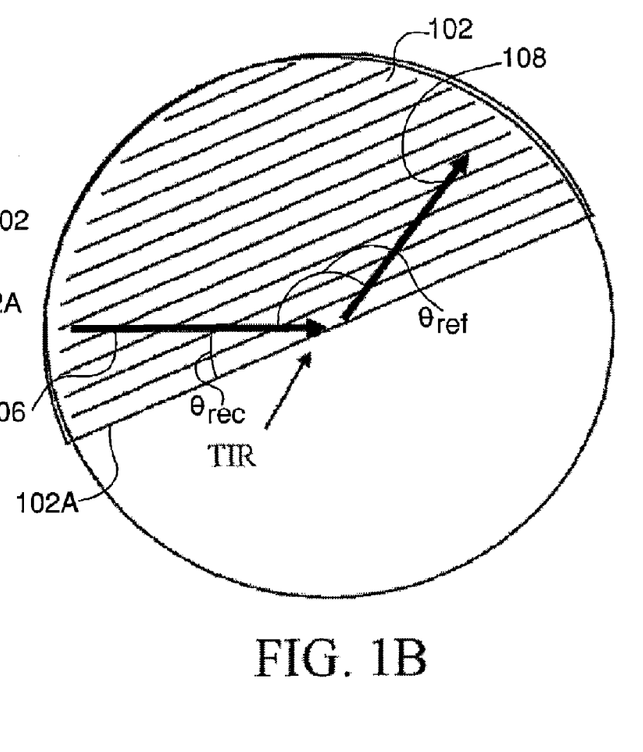

FIGS. 1A and 1B depict an example embodiment of a method according to the invention for recording a reflective volume Bragg grating ("VBG") structure by recording with a prism 104 via total internal reflection (TIR) on the outside surface 102A of a sample 102. In accordance with the invention, a VBG structure could be an element, wafer, filter, etc., without limitation.

Light 106 at the recording wavelength enters the prism 104, which may be made out of a transparent material. The sample of the recording medium 102 may be attached to one side 104B of the prism 104 so that a continuous path is formed from the inside of the prism 104 into the recording medium 102 without going into air.

The light 106 encounters total internal reflection (TIR) on the outside surface 102A of the sample of the recording medium 102, upon which the incident wave 106 interferes with the reflected wave 108, creating a standing wave pattern inside the recording medium 102. The planes of the Bragg grating recorded as a result are parallel to the outside surface 102A of the recording medium 102.

Rotating the prism/sample assembly changes the incident angle $\theta_{rec}$, which changes the angle of reflection $\theta_{ref}$ between the incident wave 106 and the reflected wave 108 of the recording light inside the recording medium 102. This, in turn, leads to a change in the period of the Bragg grating.

Therefore, continuous tuning of the Bragg grating may be achieved via continuous rotation of the prism/sample assembly.

Thus, an embodiment of a method according to the invention for recording a reflective VBG filter may include providing a sample 102 of an optical recording medium. The sample 102 may be a wafer, for example, and may include one or more flat surfaces 102A, 102B. At least one of the surfaces 102A may have an optical quality polish.

A prism 104 may be made out of a material that is transparent at the desired recording wavelength, and has an index of refraction that is approximately equal to that of the recording medium 102. The prism 104 may be prepared such that at least two of its sides 104A, 104B are flat. At least one of those sides 104A, may have an optical quality polish. One of the sides 102B of the recording medium 102 may be brought into contact with one of the flat sides 104B of the prism 104, so that the polished side 102A of the sample (wafer) 102 is facing away from the prism 104. Thus, a continuous optical path may be achieved from the inside of the prism 104 into the inside of the sample 102 through the flat interface (102B/104B) without going into the air. Examples include, but are not limited to, using index-matching fluid at the sample/prism interface or achieving direct optical contacting between the two surfaces 102B, 104B.

Light 106 at the recording wavelength may be injected through the polished side 104A of the prism 104. The light 106 will propagate through the volume of the prism 104, and through the prism/sample interface 104B/102B without suffering a total internal reflection. The incident light 106 will continue to propagate all the way to the outside surface 102A of the sample 102. The incident angle $\theta_{rec}$ may be set so that the condition of Equation (1) is met inside the recording medium sample 102. The angle $\theta_{rec}$ may be measured between the wavevector of the incident recording light 106 and the outside surface 102A of the sample 102. Once this condition is met, a total internal reflection (TIR) will occur at the outside surface 102A of the sample 102, provided $\lambda_{op} > \lambda_{min}$, where $\lambda_{min}$ is approximately given by the following formula:

$$\lambda_{min} \approx \frac{\lambda_{op}}{\cos(\arcsin(1/n_{rec}))}, \quad (2)$$

where $n_{rec}$ is the index of refraction of recording medium 102. According to Equation (2), if $\lambda_{rec}=325$ nm and $n_{rec}=1.52$, then $\lambda_{min} \cong 432$ nm.

Light 106 incident onto the sample 102 of the recording medium and light 108 reflected via the total internal reflection (TIR) on the outside surface 102A of the sample 102 create a standing wave pattern inside the material 102. This pattern will be imprinted in the photosensitive material 102, eventually leading to the formation of a Bragg grating at $\lambda_{op}$. The planes of this standing wave will be parallel to the surface 102A of the sample 102 on which the TIR has occurred. The standing wave pattern created via the TIR may have a maximum at the reflecting surface 102A.

It should be understood that, if the back surface 102A of the sample 102 has a curvature, then the recorded VBG structure will have a period that varies depending on location within the sample 102. This effect can be used deliberately for recording VBG structures with continuously varying period with a required dependence of the latter on the position along the surface 102A of the sample 102.

Figure 2:
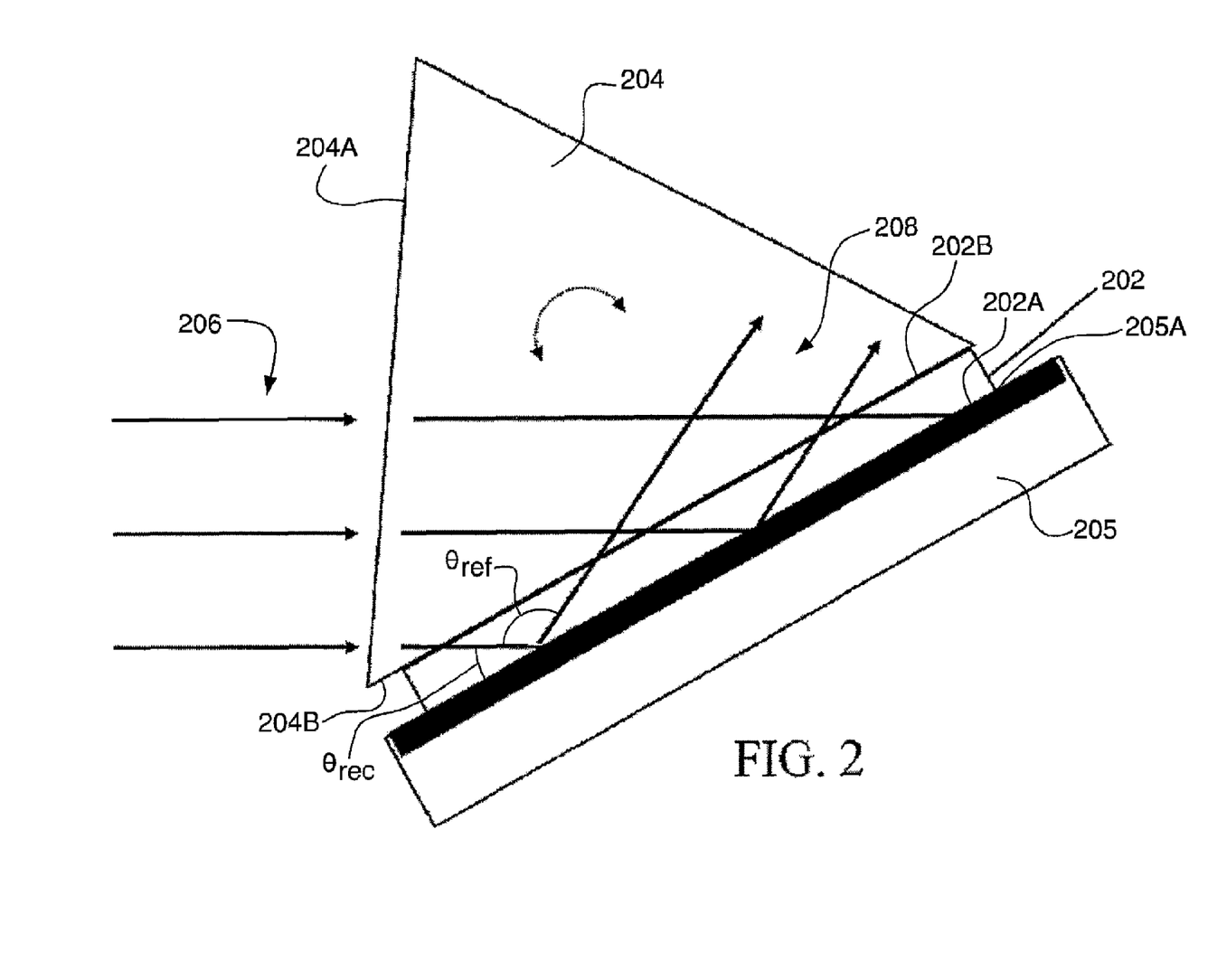
FIG. 2 depicts recording with a prism using a reflective surface attached to the outside surface of the sample.

FIG. 2 depicts recording with a prism 204 using a reflective surface 205A attached to the outside surface 202A of the sample 202. Light 206 at the recording wavelength enters the prism 204, which may be made of a transparent material. The sample 202 of the recording medium is attached to one side 204B of the prism 204 so that a continuous path is formed from the inside of the prism 204 into the recording medium 202 without going into air. A material 205 having a reflective surface 205A is attached to the other side 202A of the sample 202 so that a continuous path is formed from the inside of the sample 202 onto the reflective surface 205A without going into air. The material 205 may be a mirror, for example. The incident light 206 is reflected from the reflecting surface 205A, upon which the incident wave 206 interferes with the reflected wave 208, creating a standing wave pattern inside the recording medium 202. Rotating the prism/sample assembly changes the incident angle $\theta_{rec}$, which changes the angle of reflection $\theta_{ref}$ between the incident wave 206 and the reflected wave 208 of the recording light inside the recording medium 202. This, in turn, leads to a change in the period of the Bragg grating. Therefore, continuous tuning of the Bragg grating period is achieved via continuous rotation of the prism/sample assembly.

Thus, another embodiment of a method according to the invention for recording a reflective VBG filter may include bringing a flat reflective surface 205A, such as a mirror, into direct contact with the outside surface 202A of the sample 202. Thus, a continuous optical path may be formed from the inside of the sample 202 onto the reflective surface 205A through the interface without going into the air. This condition may be achieved by a variety of methods, including, but not limited to, the use of an index-matching fluid at the interface. Light 206 at the desired recording wavelength may be injected through the polished side 204A of the prism 204. The light 206 will propagate through the volume of the prism 204, through the prism/sample interface (204B, 202B) without suffering a total internal reflection, and to the reflecting surface 205A in contact with the outside surface 202A of the sample 202.

The incident angle $\theta_{rec}$ may be set so that the condition of Equation (1) is met inside the recording medium sample 202. The angle $\theta_{rec}$ may be measured between the wavevector of the incident recording light 206 and the reflective surface 205A. Upon completing these steps, the incident recording beam 206 will be reflected at the reflecting surface 205A. The reflected wave 208 will create a standing wave pattern via interference with the incident wave 206. This pattern will be imprinted in the photosensitive material 202, eventually leading to the formation of a Bragg grating at $\lambda_{op}$. In this case, $\lambda_{op}$ need not be limited by the condition of Equation (2).

It should be understood that, if the reflective surface 205A has a curvature, then the recorded VBG structure will have a period that varies depending on location. This effect can be used deliberately for recording VBG structures with continuously varying period with a required dependence of the latter on the position along the surface of the sample 202.

Figure 3:
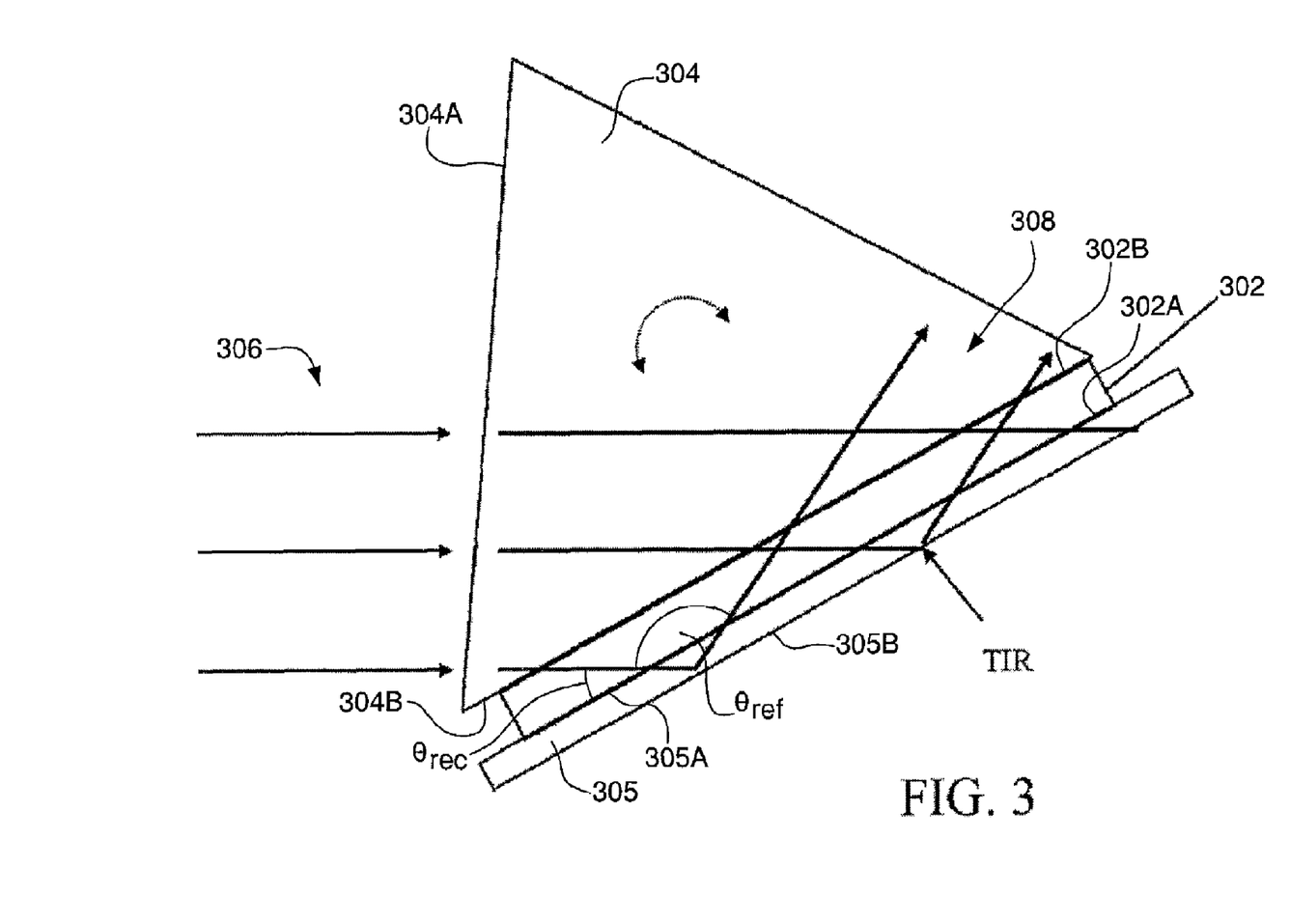
FIG. 3 depicts recording with a prism using an auxiliary optical flat attached to the outside surface of the sample.

FIG. 3 depicts recording with a prism 304 using an auxiliary optical flat 305 attached to the outside surface 302A of the sample 302. Light 306 at the recording wavelength enters the prism 304, which may be made out of a transparent material. The sample 302 is attached to one side 304B of the prism 304 so that a continuous path is formed from the inside of the prism 304 into the recording medium 302 without going into air. The auxiliary optical flat 305 is attached to the other side 302A of the sample 302 so that a continuous path is formed from the inside of the sample 302 into the inside of the auxiliary optical flat 305 without going into air.

The light encounters total internal reflection (TIR) on the outside surface 305B of the auxiliary optical flat 305, upon which the incident wave 306 interferes with the reflected wave 308, creating a standing wave pattern inside the recording medium 302. Rotating the prism/sample assembly changes the incident angle $\theta_{rec}$, which changes the angle of reflection $\theta_{rec}$ between the incident wave 306 and the reflected wave 308 of the recording light inside the recording medium 302. This, in turn, leads to a change in the period of the Bragg grating. Therefore, continuous tuning of the Bragg grating period may be achieved via continuous rotation of the prism/sample assembly.

Thus, another embodiment of a method according to the invention for recording a reflective VBG filter may include having an auxiliary optical flat 305 made of a transparent material, such as glass, for example, brought into contact with the outside surface 302A of the sample 302 of the recording medium. The auxiliary optical flat 305 may be prepared such that it has two flat surfaces 305A, 305B, at least one of which 305B having an optical quality polish on it. A continuous optical path may be achieved from the inside of the recording medium sample 302 into the inside of the auxiliary optical flat 305 through their interface 302A, 305A without going into the air. In this case, recording will be accomplished when TIR occurs on the outside surface 305B of the auxiliary optical flat 305.

It should be understood that, if the back surface 305B of the auxiliary optic flat 305 has a curvature, then the recorded VBG structure will have a period that varies depending on location. This effect can be used deliberately for recording VBG structures with continuously varying period, with a required dependence of the latter on the position along the surface of the sample 302.

The above-described methods may provide any of a number of advantages over known systems. For example, because the Bragg grating is recorded through the operating surface of the VBG filter, the clear aperture of the resultant filter need not be limited by sample absorption or any other fundamental properties of the material. This allows for recording of the filters with, theoretically, arbitrarily large apertures. Also, the Bragg wavelength of the recorded gratings can be tuned continuously in a very wide range without making any changes in the recording setup (aside from rotating the sample/prism assembly on a rotation platform). Continuous tuning of $\lambda_{op}$ from approximately 450 nm to approximately 1100 nm has been demonstrated. Further, only one beam needs to be incident onto the sample/prism assembly, which greatly simplifies the recording setup. The two interfering beams are created inside a solid medium and substantially do not propagate via different optical paths. This leads to an outstanding stability of the recording process. Additionally, polishing of the orthogonal sides of the VBG filter is not required, which greatly reduces the cost of the produced VBG filters.

Figure 4:
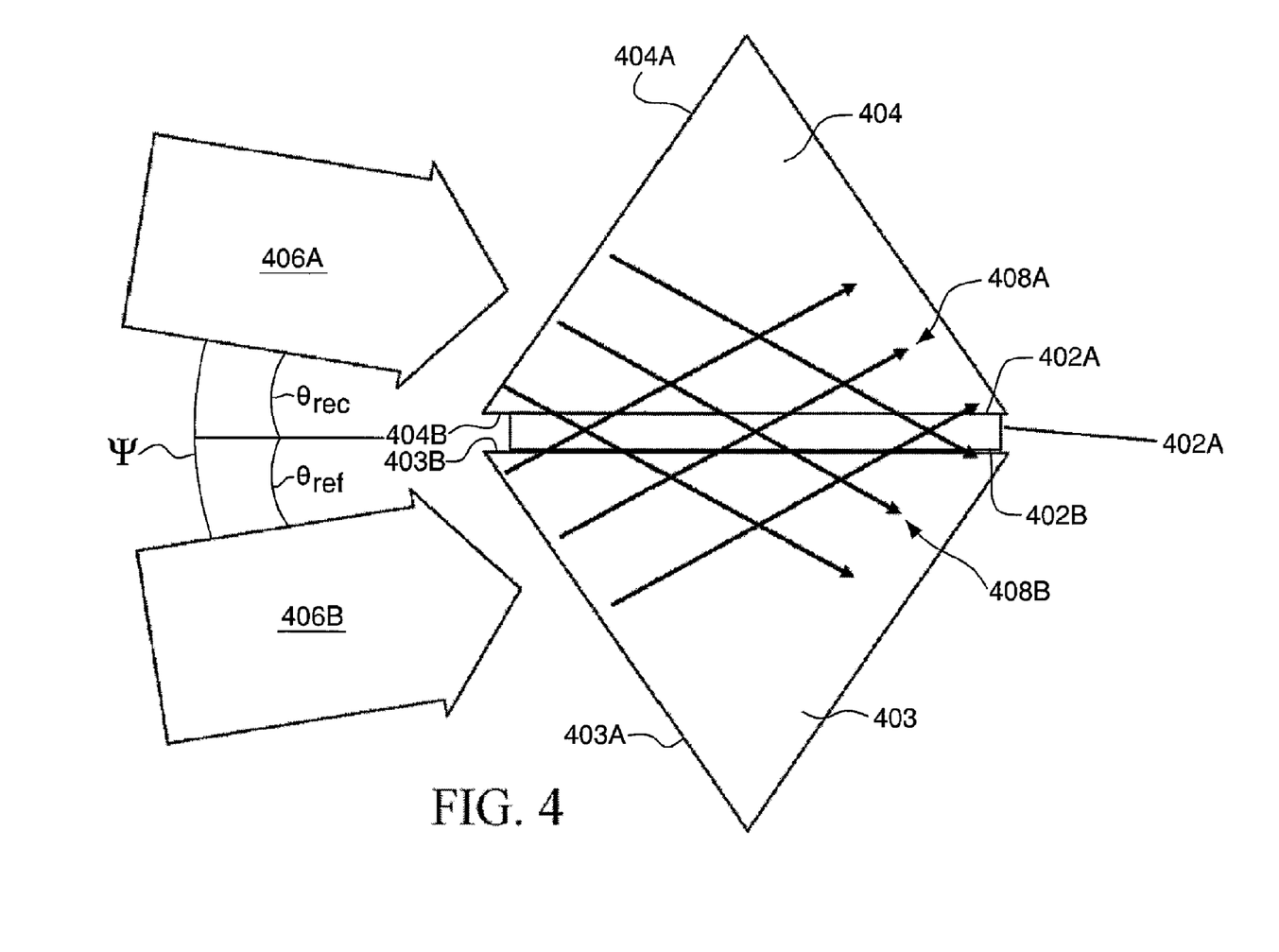
FIG. 4 depicts recording with a prism pair.

FIG. 4 depicts recording with a pair of prisms 403, 404 that are brought into contact with two surfaces 402A, 402B of the sample 402 of the recording medium so that a continuous path is formed from the inside of the prisms 403, 404 into the recording medium 402 without going into air. The prisms 403, 404 may be made of a transparent material, such as glass, for example. Two mutually coherent beams 406A, 406B of light at the recording wavelength may be formed and directed onto the prism/sample assembly. The two beams enter the recording medium 402 and form a standing wave pattern leading to the formation of a Bragg grating. Tuning of the angle $\psi=2\theta_{rec}$ between the two recording beams 406A, 406B achieves tuning of the Bragg wavelength of the recorded grating. Note that the two recording beams 406A, 406B may be exactly collinear and, therefore, be part of one continuous flat wavefront.

Thus, another embodiment of a method according to the invention for recording a reflective VBG filter may include making two prisms 403, 404 out of a material that is transparent at the recording wavelength and has an index of refraction approximately equal to that of the recording medium 402. Each prism 403, 404 may be prepared such that at least two of its sides 403A, 403B, 404A, 404B are flat. At least one of those sides 403A, 404A may have an optical quality polish.

One of the sides 402A of the recording medium 402 may be brought into contact with one of the flat sides 403B of one of the prisms 403. The other side 402B of the recording medium 402 may be brought into contact with one of the flat sides 404B of the other prism 404. Thus, a continuous optical path may be achieved from the inside of the prisms 403, 404 into the inside of the sample 402 through the flat interfaces 402A/404B, 402B/403B without going into the air.

Two mutually coherent beams 406A, 406B may be formed at the recording wavelength by using amplitude division, wavefront division, or any other of the well-known techniques of optical holography. Each of these two beams 406A, 406B may be injected into a respective one the two prisms 403, 404 attached to the sample 402 of the recording medium. The incident angle of the recording light beams 406A, 406B may be set onto the prisms 403, 404 so that the condition of the Equation (1) is met inside the recording medium 402. The angle $\theta_{rec}$ may be measured between the wavevector of the incident recording beams 406A, 406B and their bisector. It should be understood that the two recording beams 406A, 406B may be parallel to each other and, therefore, may be parts of the same collimated beam of light.

It should also be understood that when the recording beams 406A, 406B have wavefronts that are curved, the recorded VBG structure will have a period that varies depending on location. This effect can be used deliberately for recording VBG structures with continuously varying period with a required dependence of the latter on position along the surface of the sample 402.

The recording method described in connection with FIG. 4 also enables a simple and efficient way to manipulate the shape of the spectral response of the filters recorded according to the embodiment depicted in FIG. 1. A Bragg grating produced this way will have its grating planes parallel to the outside surface of the sample, and, also, one of its maxima located precisely at that surface as well. This allows successive recording of gratings with precisely controlled period and phase, which also can be viewed as harmonics of a Fourier decomposition of a function. It should be understood that this enables construction of filters with a variety of spectral shapes by simply reproducing its Fourier transforms during the recording process.

An embodiment of the invention will now be described that allows recording of filters with nearly square spectral profile. In this embodiment, a filter with a flat top and steep spectral roll-off may be created by: a) preparing the recording setup as described in the embodiment shown in FIG. 1, where the sample/prism assembly is positioned on a rotary stage, which may be motorized; b) programming the rotary stage to continuously rotate during the time the sample is exposed to the recording light, which will continuously change the Bragg wavelength of the grating being recorded; c) setting the rotation speed to a constant value, such that $\theta_{rec}$, and, therefore, $\lambda_{op}$, changes by the desired amount from the beginning of the exposure to its end; increasing of the rotation speed and/or of the total amount of rotation will produce spectrally wider filters and vice versa.

Figure 5A:
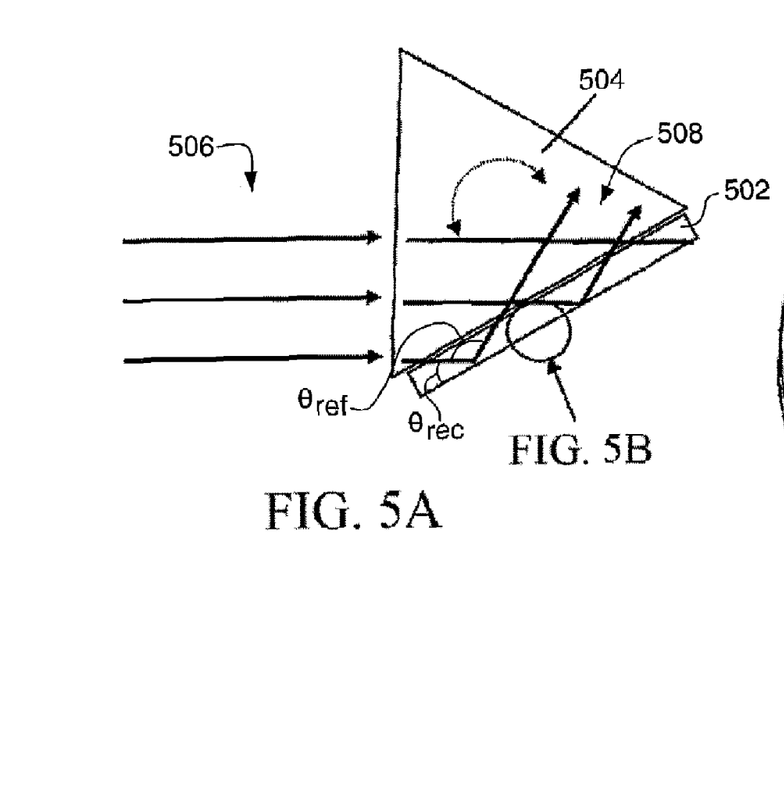
FIGS. 5A and 5B depict recording of a filter with a flat top and its spectral response function.
Figure 5B:
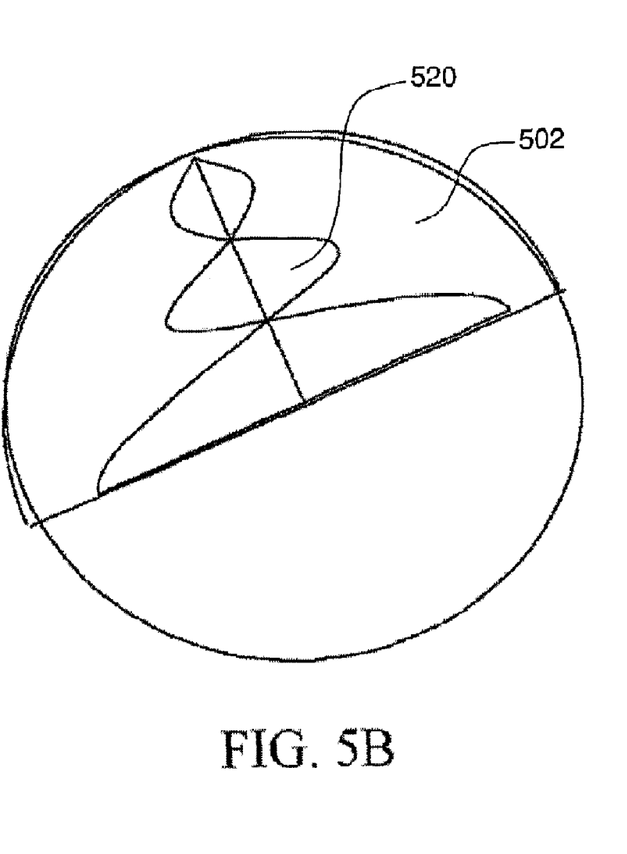

FIGS. 5A and 5B depict recording of a filter with a flat top in the spectral response function. Recording may be performed as described in connection with FIG. 1. That is, light 506 at the recording wavelength may be injected into a prism 504. The light 506 will propagate through the volume of the prism 504 to the outside surface of the sample 502. The incident angle $\theta_{rec}$ may be set so that the condition of Equation (1) is met inside the recording medium sample 502. The angle $\theta_{rec}$ may be measured between the wavevector of the incident recording light 506 and the outside surface of the sample 502. Light 506 incident onto the sample 502 and light 508 reflected via the total internal reflection (TIR) on the outside surface of the sample 502 create a standing wave pattern inside the material 502. This pattern will be imprinted in the photosensitive material 502, eventually leading to the formation of a Bragg grating at $\lambda_{op}$.

Figure 5C:
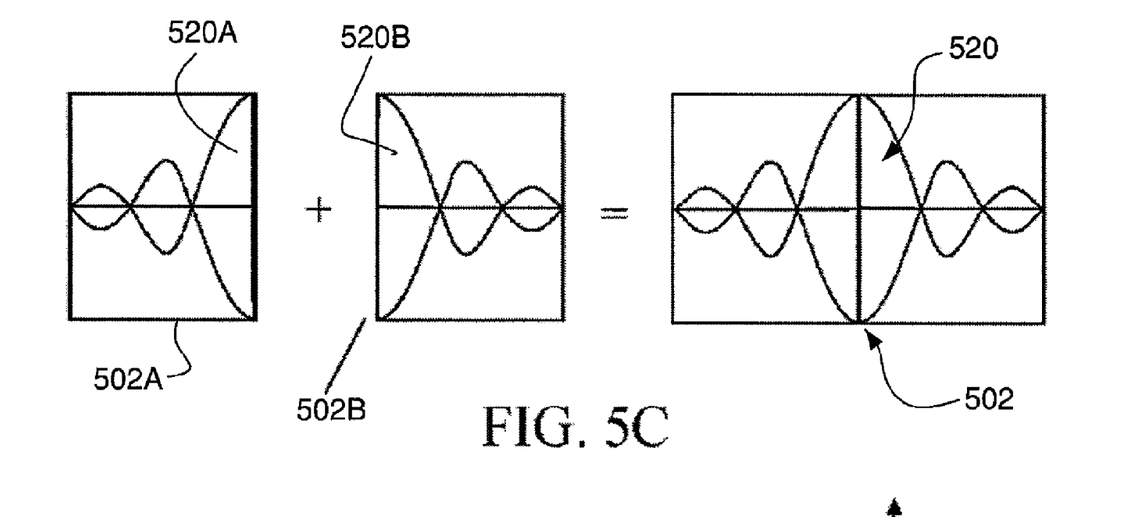
FIG. 5C depicts forming a continuous optical path from two filters.
Figure 5D:
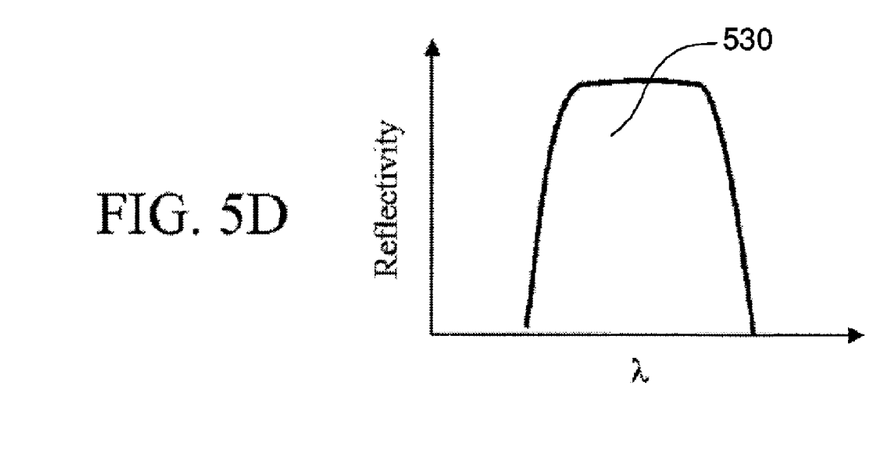
FIG. 5D shows a spectral response function.

The prism/sample assembly, however, may be rotated during the course of exposure, which changes the angle of reflection $\theta_{ref}$. Preferably, the prism/sample assembly is rotated with substantially constant speed. As a result, a Bragg grating may be formed inside the recording medium 502 with an amplitude profile 520 approximately such as that depicted in FIG. 5B. Note that a single recording according to the steps described above will produce one half 520A, 520B of a symmetric filter 520. In order to produce a fully symmetric filter, two identical halves 502A, 502B may be brought into physical contact at the appropriate surfaces, as shown in FIG. 5C. When two identical filters 502A and 502B are recorded in such a manner and brought into direct contact, a continuous optical path may be formed from filter 502A into filter 502B and vice versa. The resultant compound filter 502 will have spectral response function 530 with flattened top, such as depicted in FIG. 5D.

Figure 6A:
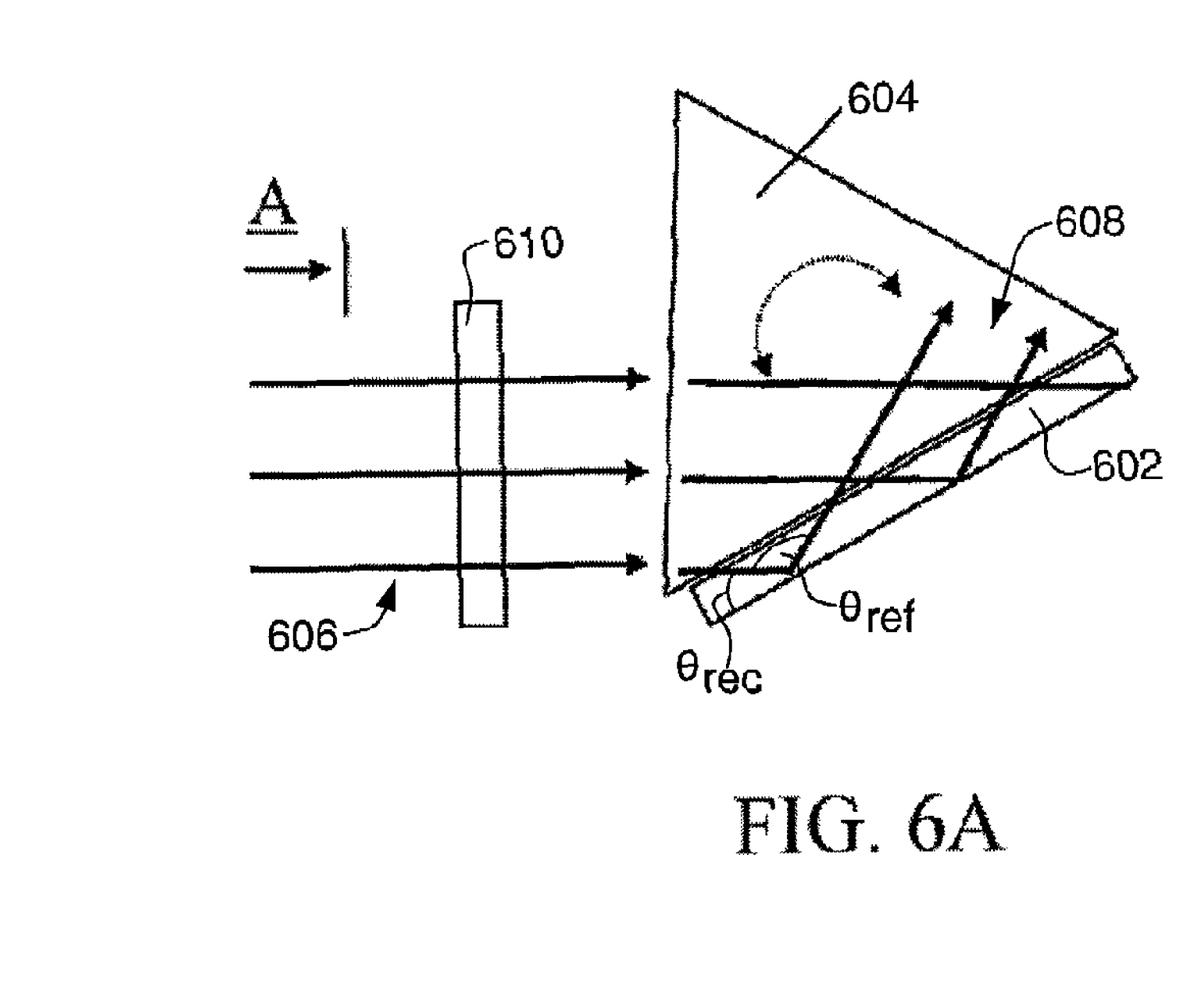
FIGS. 6A and 6B depict recording a filter with a location-dependent grating period.
Figure 6B:
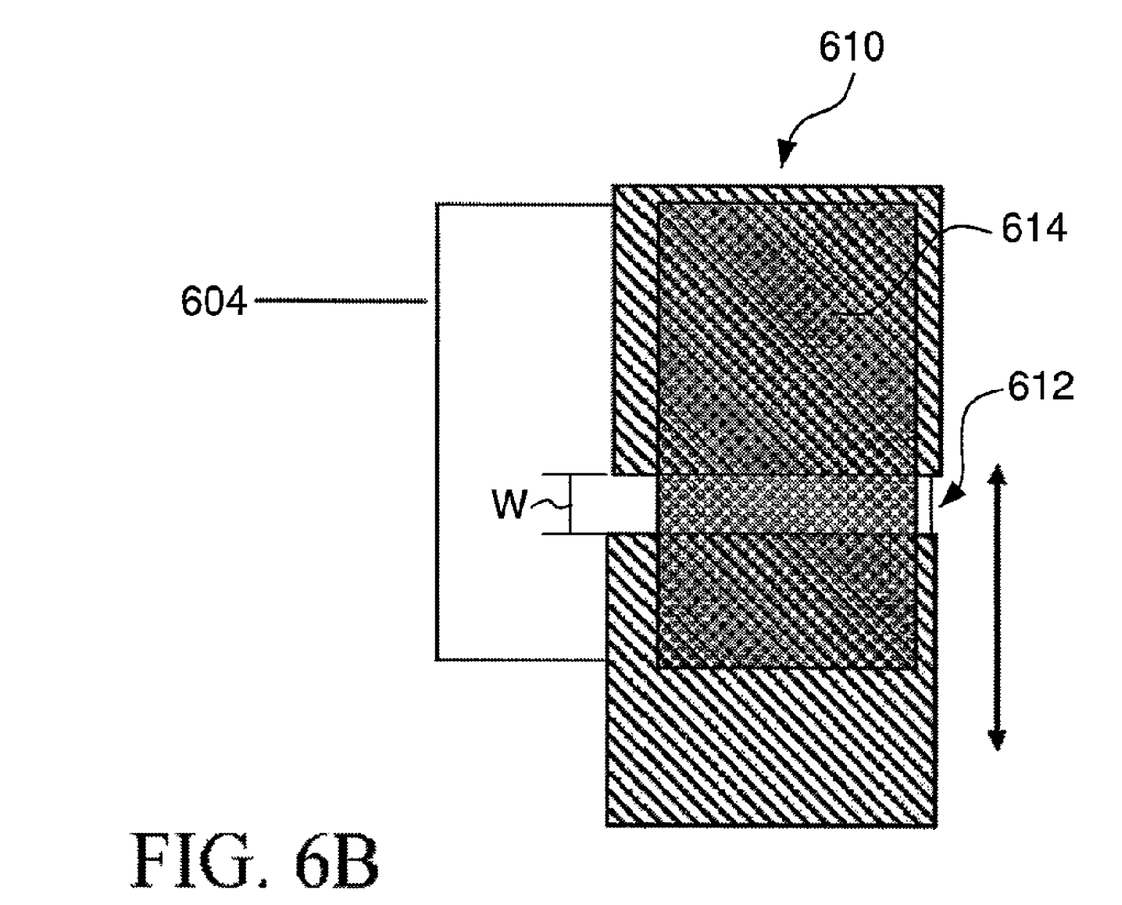

FIGS. 6A and 6B depict recording of a filter with location-dependent grating period. The recording setup in this example is prepared as described above in connection with FIGS. 1-3. That is, light 606 at the recording wavelength may be injected into a prism 604. The light 606 will propagate through the volume of the prism 604 to the outside surface of the sample 602. The incident angle $\theta_{rec}$ may be set so that the condition of Equation (1) is met inside the recording medium sample 602. Light 606 incident onto the sample 602 and light 608 reflected via the total internal reflection (TIR) on the outside surface of the sample 602 create a standing wave pattern inside the material 602. This pattern will be imprinted in the photosensitive material 602, eventually leading to the formation of a Bragg grating.

A mask 610 with a horizontal slit 612 may be placed in the path of the recording light 606. The mask 610 covers the entrance aperture of the prism 604, except for the slit 612. During the course of exposure, the mask 610 is translated along a vertical translation axis (as shown by the double-headed arrow in FIG. 6B), and the prism/sample assembly is rotated, so that a grating is formed with different periods in different sample locations.

Thus, if a moving mask 610 is used during the recording process, a filter with a spatially varying wavelength profile can be constructed. This embodiment includes preparing the recording setup as described in either one of the embodiments shown in FIGS. 1-3, where the sample/prism assembly 602/604 is positioned on a rotary stage (not shown), which is preferably motorized. A mask 610 may be placed in front of the prism/sample assembly 602/604 in the path of the recording beam 606. The mask 610 may have a horizontal slit 612 of a desired width w, and may be positioned on a translation stage (not shown), which is preferably motorized. The translation stage enables the mask 610 to move in a direction perpendicular to the slit 612.

The rotary stage controlling the sample/prism assembly 602/604 and the linear stage controlling the mask 610 may be programmed to move coordinately, so that the desired regions of the sample 602 are exposed at a desired incident angle $\theta_{rec}$ of the recording beam, or over a range of incident angles. This method can produce either a discrete pattern of regions containing gratings of different Bragg wavelength, or a grating with continuously varying Bragg wavelength along one spatial direction ("wavelength-shifted" VBG). It should be understood that instead of a slit mask, the recording beam itself can be shaped into a thin line and then translated across the face of the prism/sample assembly in the manner described above.

Figure 7:
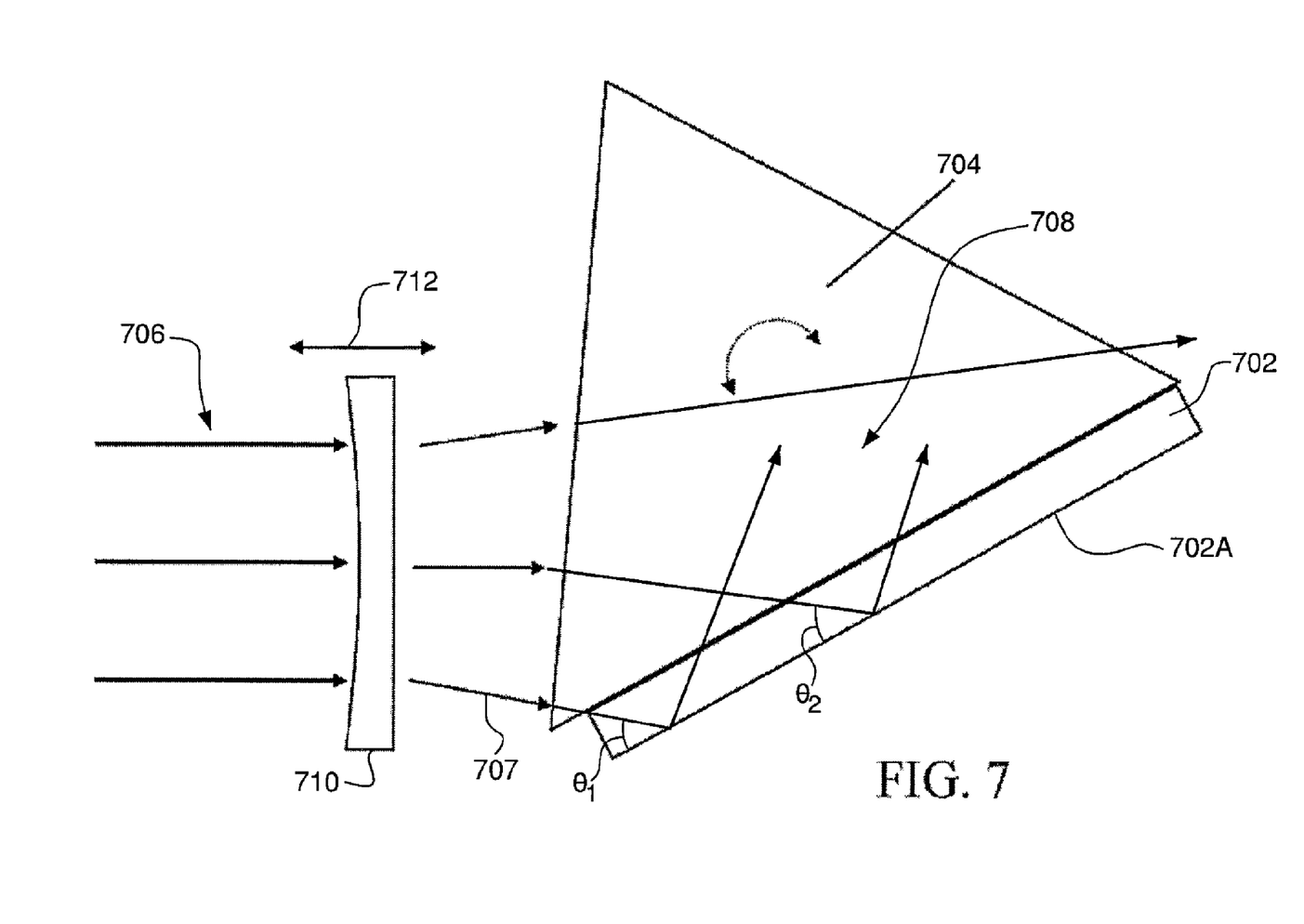
FIG. 7 depicts another embodiment for recording a VBG with spatially varying period.

Another embodiment for recording a VBG with spatially varying period is shown in FIG. 7. In this case, an optical element 710 may be placed in the path of the recording beam 706. Normally, the recording beam 706 will be collimated. The optical element 710 will produce a curved wavefront 707, which, upon entering the prism 704 and the sample 702 of the recording medium, is reflected from either the back surface of the recording medium 702 or other reflective surfaces, such as those described in connection with FIGS. 1-3. The optical element may be a lens, for example, or a phase mask or any optical element or system of optical elements capable of changing the shape of the incident wavefront.

The reflected wavefront 708 has the same curvature as the incident wavefront 707, which will result in different intercept angles $\theta_1$, $\theta_2$ between the incident wave 707 and the reflected wave 708 in different locations within the sample 702. The incident wave 707 and reflected wave 708 create a standing wave pattern inside the recording medium with a period that depends on the local angle, e.g., $\theta_1$, $\theta_2$, of the incident wavefront 707 relative to the reflecting surface 702A (or to the normal to the reflecting surface). As a result, a grating with spatially varying period may be recorded.

This method has the advantage of simplicity of the recording, since there is no need to move any parts during the recording process. It should be understood that instead of a positive or negative lens 710, a system of lenses or other optical elements (e.g., phase masks) can be used in order to produce a wavefront 707 with desired shape to record a VBG with a particular dependence of its period on the location across its aperture.

Thus, there have been described methods for manufacturing volume Bragg grating elements for use in optical devices. Those skilled in the art will appreciate that numerous changes and modifications may be made to the described embodiments of the invention, and that such changes and modifications may be made without departing from the spirit of the invention. That is, the invention extends to all functionally equivalent structures, methods, and uses that are within the scope of the appended claims. Those skilled in the art, having the benefit of the teachings of this specification, may affect numerous modifications thereto and changes may be made without departing from the scope and spirit of the invention in its aspects.

What is claimed:

1. A method for recording a volume Bragg grating structure having a target wavelength, the method comprising:
    providing a photosensitive recording medium;
    bringing a first face of the recording medium into contact with a face of a prism, the prism being made of a material that is transparent at a recording wavelength; and recording a Bragg grating onto the recording medium by exposing the prism to an incident light wave at the recording wavelength, wherein at the recording wavelength, the incident light wave enters the recording medium through the first face and is reflected toward the prism by a second face of the recording medium that is opposite the first face.

2. The method of claim 1, wherein the recording wavelength is shorter than the target wavelength.

3. The method of claim 1, wherein the recording medium is photosensitive at the recording wavelength.

4. The method of claim 1, further comprising:
bringing the first face of the recording medium into contact with the first face of the prism such that the incident light can enter into the recording medium at a prescribed angle.

5. The method of claim 4, further comprising:
bringing the first face of the recording medium into contact with the first face of the prism such that the incident light can enter into the recording medium at a prescribed angle without suffering total internal reflection where the face of the recording medium is brought into contact with the face of the prism.

6. The method of claim 4, further comprising:
bringing the first face of the recording medium into contact with the first face of the prism such that the incident light can enter into the recording medium at a prescribed angle such that a standing wave fringe pattern is formed inside the recording medium via total internal reflection on a second face of the recording medium that is opposite the first face thereof.

7. The method of claim 1, further comprising:
bringing a reflective surface into contact with a first face of the recording medium such that the incident light wave is reflected by said reflective surface to form a standing wave fringe pattern within the recording medium.

8. The method of claim 1, further comprising:
bringing an auxiliary piece of transparent material into contact with a first face of the recording medium such that a standing wave fringe pattern is formed within the recording medium due to a total internal reflection of the incident light on a face of the auxiliary piece of transparent material.

9. A method according to claim 1, further comprising:
adjusting an angle between the prism and the incident light wave during exposure of the recording medium to the incident light to produce a filter with a desired spectral response.

10. A method according to claim 1, further comprising:
adjusting an angle between the prism and the incident light wave during exposure of the recording medium to the incident light to produce a filter with a location-dependent target wavelength.

11. A method according to claim 1, further comprising:
bringing a second face of the recording medium into contact with a face of a second prism, the prism being made of a material that is transparent at the recording wavelength; and
recording the Bragg grating onto the recording medium by exposing the second prism to a second incident light wave at the recording wavelength.

12. A method according to claim 1, further comprising:
rotating the prism and the recording medium to produce a first half of a symmetric filter in the recording medium.

13. A method according to claim 12, further comprising:
providing a second photosensitive recording medium;
bringing a first face of the second recording medium into contact with a face of a prism, the prism being made of a material that is transparent at a recording wavelength;
recording a Bragg grating onto the second recording medium by exposing the prism to an incident light wave at the recording wavelength; and
rotating the prism and the second recording medium to produce a second half of the symmetric filter in the second recording medium.

14. A method according to claim 13, further comprising:
bringing the first and second recording media into direct contact to form a continuous optical path from the first medium into the second medium.

15. A method according to claim 1, further comprising:
placing a mask proximate an entrance face of the prism, the mask having a slit and preventing exposure of the entrance face of the prism to the incident light wave except through the slit.

16. A method according to claim 15, further comprising:
translating the mask along an axis relative to the entrance face of the prism,
rotating the prism and the recording medium relative to the incident light wave such that a grating is formed within the recording medium, the grating having varied periods in various locations within the recording medium.

17. A method according to claim 1, further comprising:
placing an optical element proximate an entrance face of the prism, said optical element receiving said incident light wave and producing a curved wavefront that is incident on an entrance face of the prism,
wherein a grating having a spatially varying period is recorded within the recording medium.

18. A method according to claim 17, wherein the optical element includes a lens.

19. A method according to claim 17, wherein the optical element includes a phase mask.

20. A volume Bragg grating structure manufactured according to a method comprising:
providing a photosensitive recording medium;
bringing a first face of the recording medium into contact with a face of a prism, the prism being made of a material that is transparent at a recording wavelength; and
recording a Bragg grating onto the recording medium by exposing the prism to an incident light wave at the recording wavelength, wherein at the recording wavelength, the incident light wave enters the recording medium through the first face and is reflected toward the prism by a second face of the recording medium that is opposite the first face.

21. An optical device comprising:
a light source; and
a volume Bragg grating structure for receiving light from the light source,
wherein the volume Bragg grating structure is manufactured according to a method comprising:
providing a photosensitive recording medium;
bringing a first face of the recording medium into contact with a face of a prism, the prism being made of a material that is transparent at a recording wavelength; and
recording a Bragg grating onto the recording medium by exposing the prism to an incident light wave at the recording wavelength, wherein at the recording wavelength, the incident light wave enters the recording medium through the first face and is reflected toward the prism by a second face of the recording medium that is opposite the first face.

22. A method for recording a volume Bragg grating structure having a target wavelength, the method comprising:

provided a photosensitive recording medium;

bringing a first face of the recording medium into contact with a face of a prism, the prism being made of a material that is transparent at a recording wavelength such that the incident light can enter into the recording medium at a prescribed angle such that a standing wave fringe pattern is formed inside the recording medium via total internal reflection on a second face of the recording medium that is opposite the first face thereof; and recording a Bragg grating onto the recording medium by exposing the prism to an incident light wave at the recording wavelength.

23. The method of claim 22, wherein the recording wavelength is shorter than the target wavelength.

24. The method of claim 22, wherein the recording medium is photosensitive at the recording wavelength.

25. A method according to claim 22, further comprising:

adjusting an angle between the prism and the incident light wave during exposure of the recording medium to the incident light to produce a filter with a desired spectral response.

26. A method according to claim 22, further comprising:

adjusting an angle between the prism and the incident light wave during exposure of the recording medium to the incident light to produce a filter with a location-dependent target wavelength.

27. A method according to claim 22, further comprising:

bringing a second face of the recording medium into contact with a face of a second prism, the prism being made of a material that is transparent at the recording wavelength; and recording the Bragg grating onto the recording medium by exposing the second prism to a second incident light wave at the recording wavelength.

28. A method according to claim 22, further comprising:

rotating the prism and the recording medium to produce a first half of a symmetric filter in the recording medium.

29. A method according to claim 28, further comprising:

providing a second photosensitive recording medium;

bringing a first face of the second recording medium into contact with a face of a prism, the prism being made of a material that is transparent at a recording wavelength;

recording a Bragg grating onto the second recording medium by exposing the prism to an incident light wave at the recording wavelength; and rotating the prism and the second recording medium to produce a second half of the symmetric filter in the second recording medium.

30. A method according to claim 29, further comprising:

bringing the first and second recording media into direct contact to form a continuous optical path from the first medium into the second medium.

31. A method according to claim 22, further comprising:

placing a mask proximate an entrance face of the prism, the mask having a slit and preventing exposure of the entrance face of the prism to the incident light wave except through the slit.

32. A method according to claim 31, further comprising:

translating the mask along an axis relative to the entrance face of the prism, rotating the prism and the recording medium relative to the incident light wave such that a grating is formed within the recording medium, the grating having varied periods in various locations within the recording medium.

33. A method according to claim 22, further comprising:

placing an optical element proximate an entrance face of the prism, said optical element receiving said incident light wave and producing a curved wavefront that is incident on an entrance face of the prism, wherein a grating having a spatially varying period is recorded within the recording medium.

* * * * *